United States Patent
Liao et al.

(10) Patent No.: US 8,098,914 B2
(45) Date of Patent: Jan. 17, 2012

(54) REGISTRATION OF CT VOLUMES WITH FLUOROSCOPIC IMAGES

(75) Inventors: Rui Liao, Plainsboro, NJ (US); Yiyong Sun, Lawrenceville, NJ (US); Liron Yatziv, Plainsboro, NJ (US); Chenyang Xu, Allentown, NJ (US)

(73) Assignee: Siemens Aktiengesellschaft, München ( * ) Notice: Subject to any disclaimer, the term of this patent is extended or adjusted under 35 U.S.C. 154(b) by 994 days.

(21) Appl. No.: 12/038,854

(22) Filed: Feb. 28, 2008

(65) Prior Publication Data

US 2008/0219536 A1    Sep. 11, 2008

Related U.S. Application Data

(60) Provisional application No. 60/892,949, filed on Mar. 5, 2007.

(51) Int. Cl.
*G06K 9/00* (2006.01)

(52) U.S. Cl. .................. 382/128; 382/154; 382/294

(58) Field of Classification Search .................. 382/154, 382/173, 231, 128–132, 294–298; 378/62, 378/98.11, 901, 98.12
See application file for complete search history.

(56) References Cited

U.S. PATENT DOCUMENTS

2006/0078195 A1*   4/2006   Vaillant et al. ................ 382/154

* cited by examiner

*Primary Examiner* — Courtney Thomas
(74) *Attorney, Agent, or Firm* — Donald B. Paschburg; F. Chau & Associates, LLC

(57) ABSTRACT

A method for registering images of multiple modalities includes acquiring first image of a subject using a first modality. A second image of the subject is acquired using a second modality. The first image includes greater structural detail of the subject than the second image and the second image is a video image including multiple image frames. The first and second images are registered based on an anatomical structure observable in the first image and a foreign object proximate to the anatomical structure observable in the second image.

21 Claims, 6 Drawing Sheets

REGISTRATION OF CT VOLUMES WITH FLUOROSCOPIC IMAGES

CROSS-REFERENCE TO RELATED APPLICATION

The present application is based on provisional application Ser. No. 60/892,949, filed Mar. 5, 2007, the entire contents of which are herein incorporated by reference.

BACKGROUND OF THE INVENTION

1. Technical Field

The present disclosure relates to image registration and, more specifically, to registration of CT volumes with fluoroscopic images.

2. Discussion of Related Art

Electrophysiology (EP) is the study of the electrical properties of the human body. In EP, electrodes are placed in contact with the tissue being observed and changes in electrical potential or current flow are observed. One particular example of EP, the human heart is catheterized with electrodes for monitoring and/or influencing electrical signals that control the beating of the heart.

Catheterization is an invasive procedure in which the catheter electrode is inserted into the heart. One particular example of catheterization is catheter ablation. Catheter ablation may be used to treat arrhythmia in a patient's heart. In catheter ablation, faulty electrical pathways are removed from the heart by advancing ablation catheters through the patient's blood vessels towards the heart. High-frequency electrical impulses are then used to induce the arrhythmia, and then ablate the abnormal tissue that is responsible for the arrhythmia.

Catheterization, for example, for the purposes of catheter ablation, is generally only performed in expensive and highly specialized facilities known as catheterization laboratories or cath labs. During catheterization, the patient is injected with a radio-contrast agent and a fluoroscopy is used to image the vessel structure. While viewing the fluoroscopy images, catheterization may be performed by inserting the ablation catheter through the vessel structure to the patient's heart.

The fluoroscopy used in catheterization is generally a two-dimensional x-ray fluoroscopy that is capable of providing real-time monitoring of the catheter as it travels through the vessel structure and enters the patient's heart. The two-dimensional x-ray fluoroscopy may not be able to show soft-tissue structures such as the atriums, the ventricles, the aorta, and the pulmonary veins, and thus navigation of the targeted area may be difficult.

To provide better visualization, the fluoroscopy image data may be registered to high-quality three-dimensional CT image data that was taken prior to the catheterization procedure. The doctor may then be able to view combined image data where the soft-tissue detail of the CT image is overlaid with the real-time fluoroscopy image.

Existing techniques for registering the two-dimensional fluoroscopy image data with the three-dimensional CT image data to a single coordinate system involve injecting radio-contrast into the vessels of interest so that the vessels are clearly visible within the fluoroscopy image. Landmark-based registration is then performed to register the images of the two modalities. In this approach, key landmarks must be manually identified within the three-dimensional CT image data. The same landmarks must then be identified within the two-dimensional fluoroscopy image data so that registration may be performed. The manual selection of landmarks may be laborious and prone to error. Moreover, because the dose of radio-contrast must be limited sue to safety concerns, the ability to identify the landmarks within the fluoroscopy image data is limited.

SUMMARY

A method for registering images of multiple modalities includes acquiring first image of a subject using a first modality. A second image of the subject is acquired using a second modality. The first image includes greater structural detail of the subject than the second image and the second image is a video image including multiple image frames. The first and second images are registered based on an anatomical structure observable in the first image and a foreign object proximate to the anatomical structure observable in the second image.

The first modality may be a computed tomography (CT) imager. The second modality may be a fluoroscopy imager. Radio-contrast may not be needed in acquiring the second image.

Registering the first and second images may include optimizing location constraints of the anatomical structure and the foreign object. The anatomical structure may be a coronary sinus and the foreign object may be a coronary sinus catheter. The anatomical structure may be an aorta and the foreign object is an aortic catheter. The spatial relationship between the anatomical structure and the foreign object may be known.

The method may additionally include displaying a combined image including the first image overlaid with the second image, in a manner consistent with the registration, such that the greater structural detail of the first image is displayed as a video image including multiple image frames.

The method may additionally include performing an electrophysiology procedure based on the displayed combined image. The electrophysiology procedure may include catheterization.

Registering the first and second images may include segmenting the anatomical structure from the first image, segmenting the foreign object from the second image, and registering the first and second images using a known spatial relationship between the anatomical structure and the foreign object. The anatomical structure may be automatically segmented from the first image using a segmentation algorithm. The anatomical structure may be segmented from the first image using user-provided input. The foreign object may be automatically segmented from the second image using a segmentation algorithm.

The first image may be a three-dimensional image and the second image may be a two-dimensional image. The anatomical structure may include soft tissue that is not observable in the second image.

A method for registering images of multiple modalities includes acquiring a three-dimensional computed tomography image of a subject, acquiring a two-dimensional fluoroscopy image of the subject, and registering the computed tomography image and the fluoroscopy image based on an anatomical structure observable in the computed tomography image and a foreign object proximate to the anatomical structure observable in the fluoroscopy image.

Registering the computed tomography image and the fluoroscopy image may include optimizing location constraints of the anatomical structure and the foreign object.

A computer system includes a processor and a program storage device readable by the computer system, embodying a program of instructions executable by the processor to perform method steps for registering images of multiple modalities. The method includes acquiring a three-dimensional computed tomography image of a subject, acquiring a two-dimensional fluoroscopy image of the subject, and registering the computed tomography image and the fluoroscopy image based on an anatomical structure observable in the computed tomography image and a foreign object proximate to the anatomical structure observable in the fluoroscopy image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
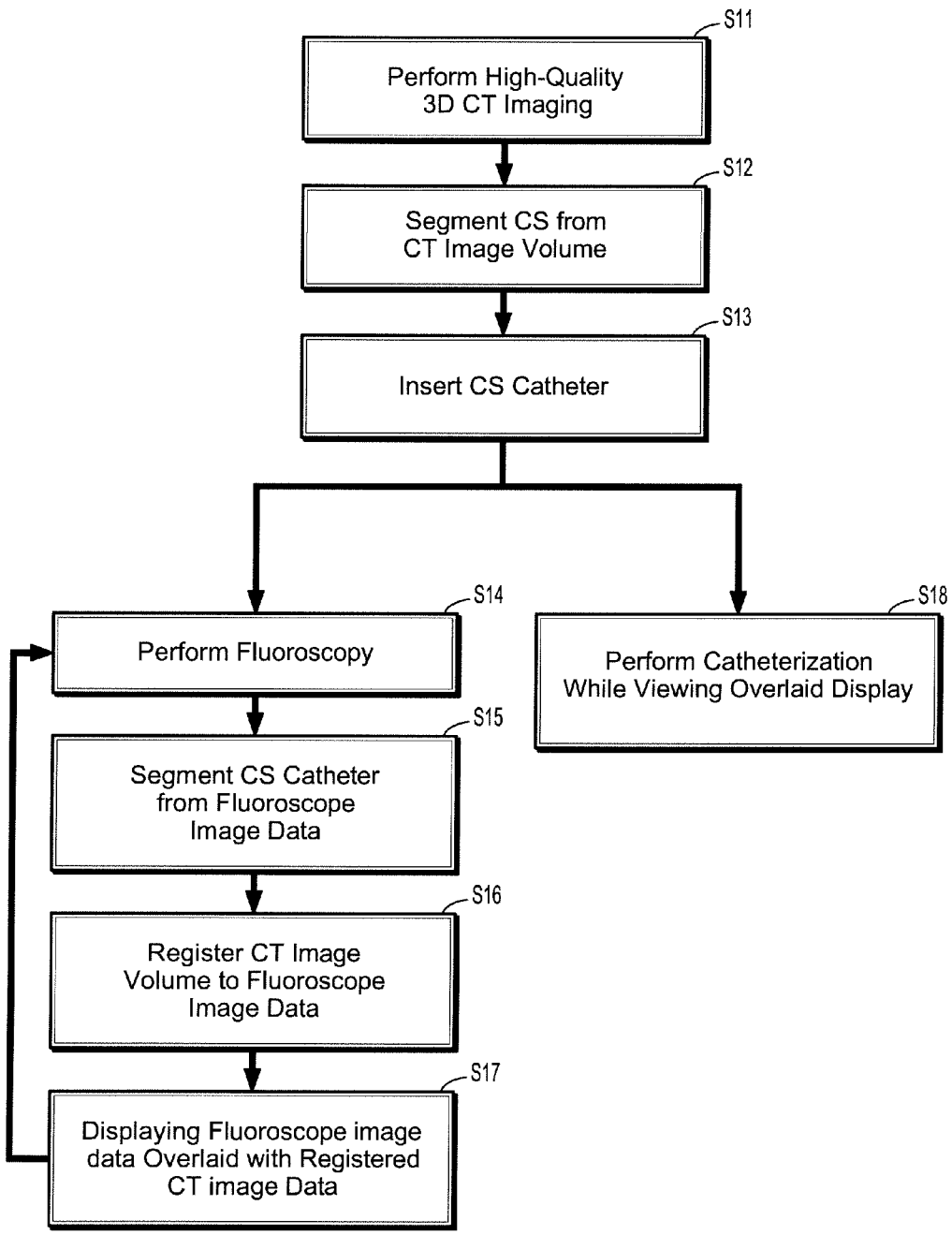
FIG. 1 is a flow chart illustrating a method for registering three-dimensional CT volume image data to two-dimensional fluoroscopy image data in accordance with an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide an accurate and automatic approach for registering two-dimensional fluoroscopy image data with three-dimensional CT image data to provide real-time high-quality images that may be used to facilitate catheterization. Moreover, exemplary embodiments of the present invention may provide for the effective registration of the two modalities without the use of additional radio-contrast agent administration.

Registration may be performed by optimizing the location constraint between the anatomical pathways such as the vessel structure or openings such as valves or fossa ovalis that catheterization is performed within. According to one exemplary embodiment of the present invention, both the coronary sinus (CS) and a CS catheter may be used as a location constraint for image registration.

In location constraint optimization, it is not necessary that the two landmarks being used as the basis for registration be identical structures. For example, when the CS of one modality is constrained against the CS catheter of the other modality, it is acceptable that these two landmarks are not identical. It is only desired that some spatial relationship between the two landmarks be understood. For example, in this case, it is understood that the CS catheter is within the CS and thus this knowledge may be used as a location constraint during registration.

The CS catheter is a catheter that has been previously placed within the CS for example, to monitor properties such as CS temperature, blood flow and pressure. The CS catheter is not the catheter that is the subject of the catheterization of exemplary embodiments of the present invention, which may be the ablation catheter. Placement of the CS catheter may be standard practice before EP procedures.

Alternatively or additionally, other vessels such as IVC, SVC, PVs and openings such as fossa ovalis may be incorporated into the registration framework.

The CS catheter, once placed, may be clearly visible within the fluoroscopy image owing to its high attenuation properties with respect to x-rays. Accordingly, location of the CS catheter within the fluoroscopy image data may be automatically, quickly, and accurately performed using automatic catheter localization algorithms known in the art.

Moreover, the CS may be segmented within the CT image data, which may be of a sufficiently high quality to easily detect the CS within the CT image data. Accordingly, automatic segmentation algorithms that are known in the art may be used to locate the CS catheter within the CT image data. Registration of the CS within the CT image data may be particularly accurate owing to the relatively narrow configuration of the CS and its clear bending shape.

The CS catheter segmented within the fluoroscopy image data may then be automatically registered against the CS segmented within the CT image data and thus two-dimensional to three-dimensional registration may be performed using the optimized location constraints of the CS catheter and the CS, respectively. Thus, the prior knowledge of the constraint on the location of the inserted CS catheter may be used to accomplish the registration of the CT volume image data with the fluoroscopy image data.

The registration process may be fully automatic as known CS segmentation algorithms may be used to automatically identify the CS within the CT image data. Additionally, CS catheter identification may similarly be performed automatically using known algorithms for identifying the CS catheter within the fluoroscopy image data. However, one or more steps may be performed manually, where necessary. For example, where CT image quality is insufficient for automatic CS identification, the CS may be segmented with input from a user according to known interactive techniques for computer-assisted diagnosis. In either case, manual landmarking may not be necessary and thus the process may be more accurate and faster than traditional approaches.

Moreover, because registration is performed against the CS catheter, which is clearly visible within the fluoroscopy image, the use of radio-contrast may be reduced or entirely eliminated.

Because the CS catheter is routinely used during EP procedures, exemplary embodiments of the present invention need not require physicians to execute additional steps in the performance of catheterization.

Exemplary embodiments of the present invention also provide a relatively large capture ratio such that the images of the two different modalities, for example, the CT volume and the fluoroscopy image, may have a relatively large initial offset and still result in accurate registration.

Accordingly, exemplary embodiments of the present invention may be use to provide accurate and automatic registration of three-dimensional CT image data to two-dimensional fluoroscopy image data without the use of potentially dangerous radio-contrast agents or manual landmarking of images. Moreover, the reduced requirements may permit the performance of various EP procedures such as catheter ablation in smaller and medium sized hospitals that lack sophisticated and expensive catheter laboratories.

FIG. 1 is a flow chart illustrating a method for registering three-dimensional CT volume image data to two-dimensional fluoroscopy image data in accordance with an exemplary embodiment of the present invention. First, the patient may be scanned, for example, using a CT scanner to produce a set of three-dimensional image data (Step S11). Other approached to acquiring the three-dimensional image data known in the art of radiology may be used either independently or in combination with the CT scanner. Next, the CS may be segmented from the three-dimensional image data (Step S12). Where the CT image data is of sufficiently high quality, segmentation of the CS may be performed automatically using known algorithms as described above. Where the CT image data is not of sufficiently high quality, segmentation may be user-assisted.

The performance of segmenting the CS from the CT image data (Step S12) need not occur immediately after performing the CT image scanning of Step S11, Step S12 may be performed at any point prior to the registration step of S16.

A CS catheter may be inserted into the patient (Step S13). As discussed above, this step is normally performed prior to EP procedures so no additional action on the part of the physician may be necessary in performing exemplary embodiments of the present invention. Fluoroscopy may then be performed (Step S14). Because fluoroscopy may be a real-time continuous display, the fluoroscopy image data may include a sequence of frames. The complete processing of the fluoroscopy image as described in steps S15 through S17 may thus be repeated for each frame to provide a real-time moving representation for the benefit of the physician performing catheterizations.

Figure 2:
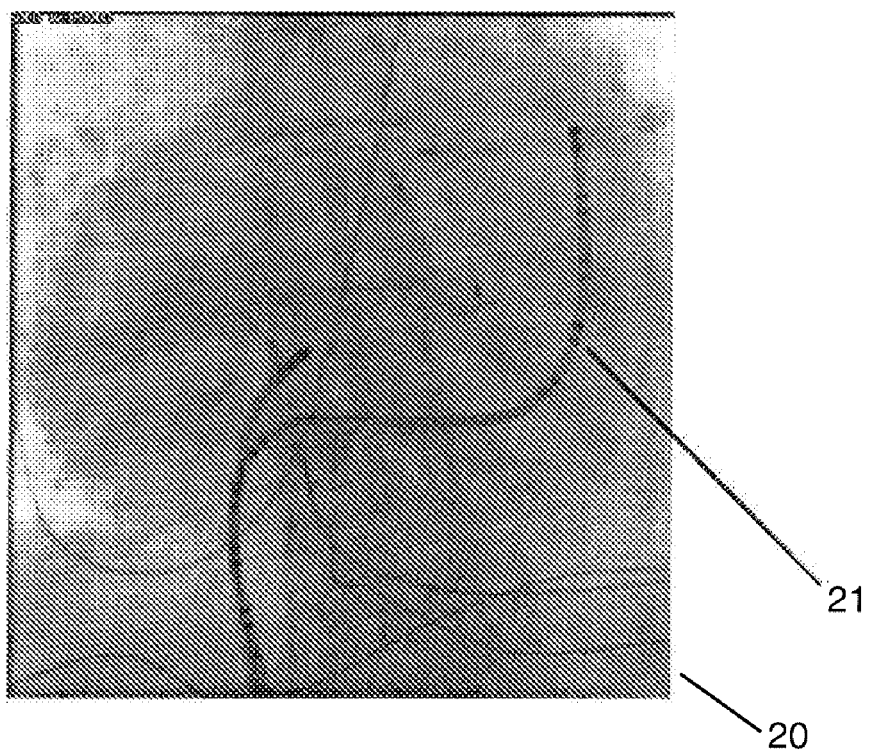
FIG. 2 is a fluoroscopy image taken without the use of radio-contrast where the CS catheter has been segmented according to an exemplary embodiment of the present invention.

Thus, for each fluoroscopy frame, the CS catheter may be segmented (Step S15). This segmentation may be performed automatically, for example, as described above. The fluoroscopy may be performed without the use of radio-contrast. FIG. 2 is an example of a fluoroscopy image 20 taken without the use of radio-contrast where the CS catheter 21 has been segmented according to an exemplary embodiment of the present invention. As can be seen from this image 20, the lack of radio-contrast makes it difficult to observe bodily structure; however, the CS catheter 21 is still plainly visible.

Next, the CT image volume may be registered to the fluoroscopy image data (Step S16). Registration may be performed using the optimized location constraints of the CS catheter of the fluoroscopy image and the CS of the CT image, for example, as discussed above. Alignment between the CS segmented from the CT volume and the CS catheter shown on fluoroscopy may be solved using different techniques, for example, manual alignment, automatic line to line registration, automatic point cloud to surface registration, and/or other such techniques known in the art.

Figure 3:
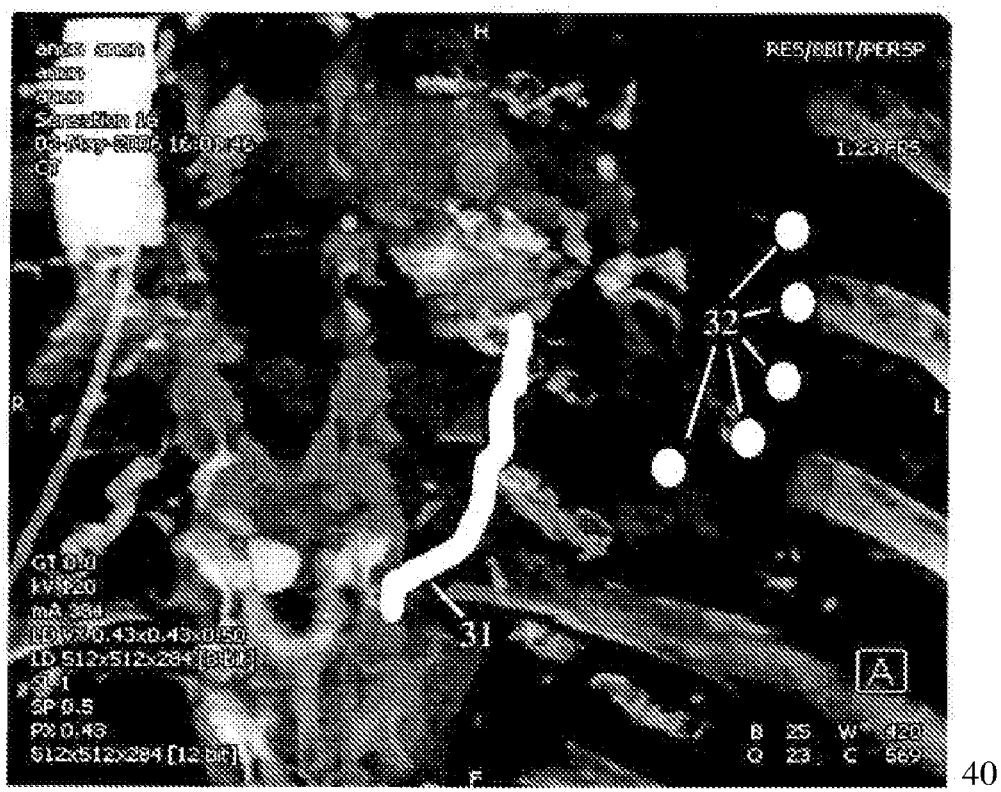
FIG. 3 is a CT image prior to registration to the fluoroscopy image according to an exemplary embodiment of the present invention.
Figure 4:
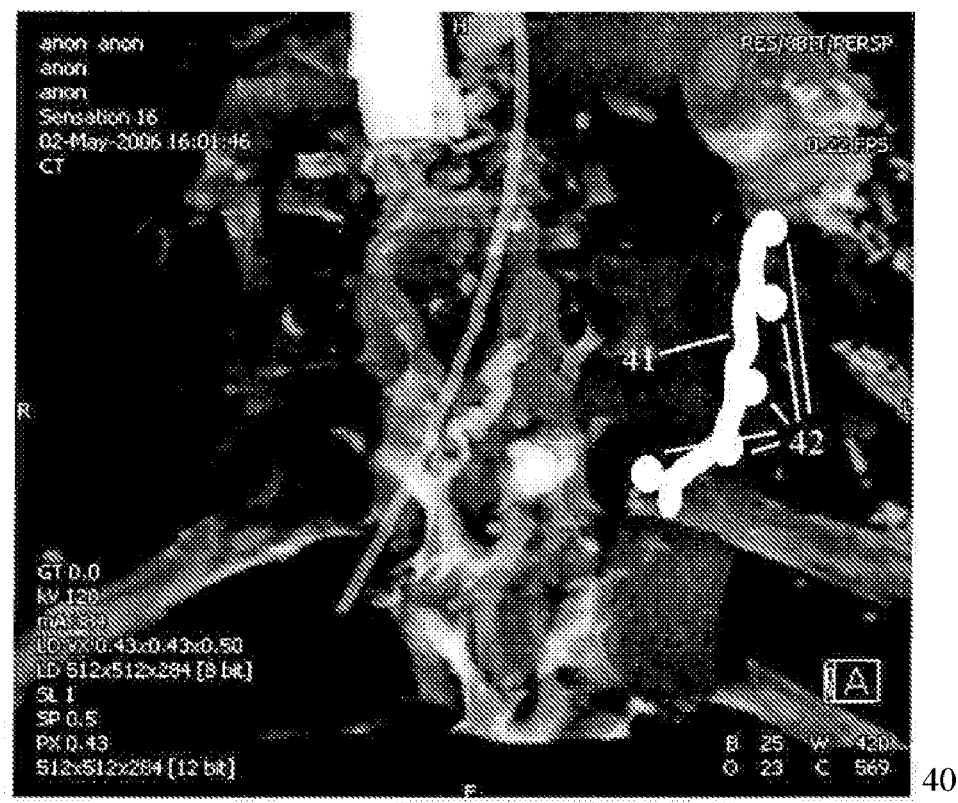
FIG. 4. is a CT image after registration to the fluoroscopy image according to an exemplary embodiment of the present invention.

FIG. 3 is an example of a CT image 30 prior to registration to the fluoroscopy image. The segmented CS 31 is highlighted in white and the CS catheter 32 from the fluoroscopy image is overlaid but not yet registered. FIG. 4 is an example of a CT image 40 after registration to the fluoroscopy image. The segmented CS 41 is here registered to the CS catheter 42 of the fluoroscopy image. This image represents the fluoroscopy image data overlaid with the registered CT image data. Such an image may be displayed (Step S17) while the catheterization is performed (Step S18).

Exemplary embodiments of the present invention may thus be able to maintain image registration between the fluoroscopy image and the CT image even as the patient breaths and the patient's heart beats. This is because the CS catheter moves in phase with the beating heart. Thus, the patient's heart beat may be tracked by observing the CS catheter movement from frame to frame of the fluoroscopy image and the overlay of the CT image with the fluoroscopy image may be updated dynamically throughout the fluoroscopic sequence to compensate for cardiac and breathing motion.

Figure 5:
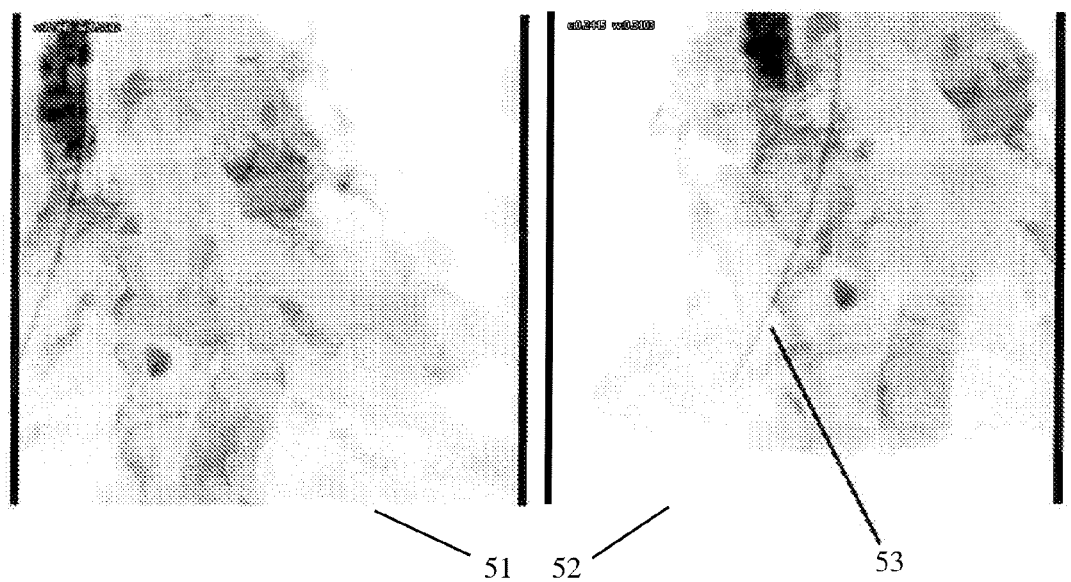
FIG. 5 illustrates digitally reconstructed radiography (DRR) images generated from the CT volume image data to demonstrate registration according to an exemplary embodiment of the present invention.

To greater illustrate the effectiveness of exemplary embodiments of the present invention, FIG. 5 illustrates digitally reconstructed radiography (DRR) images generated from the CT volume image data to demonstrate registration. The DDR images 51 and 52 are representations of fluoroscopy images constructed from CT image data. In the first DDR image 51, taken prior to fluoroscopy image registration, no CS catheter may be seen. In the second DDR image 52, the CS catheter 53 may be seen at its correct location. Accordingly, it may be seen that registration between the two-dimensional fluoroscopy image and the three-dimensional CT image, as performed according to exemplary embodiments of the present invention, may be fast and accurate and may thus allow for the overlay of fluoroscopy image data with CT image data so that a physician may perform a PE procedure such as catheterization while viewing an image that is both real-time and highly detailed.

Exemplary embodiments of the present invention for registering images from multiple modalities need not be limited to the examples described above. For example, a landmark other than the CS may be used to perform location constraint optimization. What is desired is that a spatial relationship be understood between a landmark that is visible in the first modality and a landmark that is visible in a second modality. In an exemplary embodiment of the present invention, an aorta structure visible in the CT image may be constrained against an aortic catheter visible in the fluoroscopy image. In such an example, no radio-contrast would be required when performing the fluoroscopy imaging as the aortic catheter is x-ray opaque.

The fluoroscopy image need not be two-dimensional and/or the CT image need not be three-dimensional. For example, fluoroscopic images may be taken from multiple angles such as in a biplane system. The fluoroscopic images may then be used to reconstruct a three-dimensional volume image including the CS catheter. The CS catheter of the three-dimensional fluoroscopic image may then be registered with the CS of the CT image volume.

Alternatively, image registration may be performed with the multiple fluoroscopy images by projecting the three-dimensional CT image volume into multiple two-dimensional projections that correspond to the multiple fluoroscopy images and then performing multiple registrations for the matched pairs of CT projections and fluoroscopy images. The multiple registrations may be performed substantially simultaneously.

Figure 6:
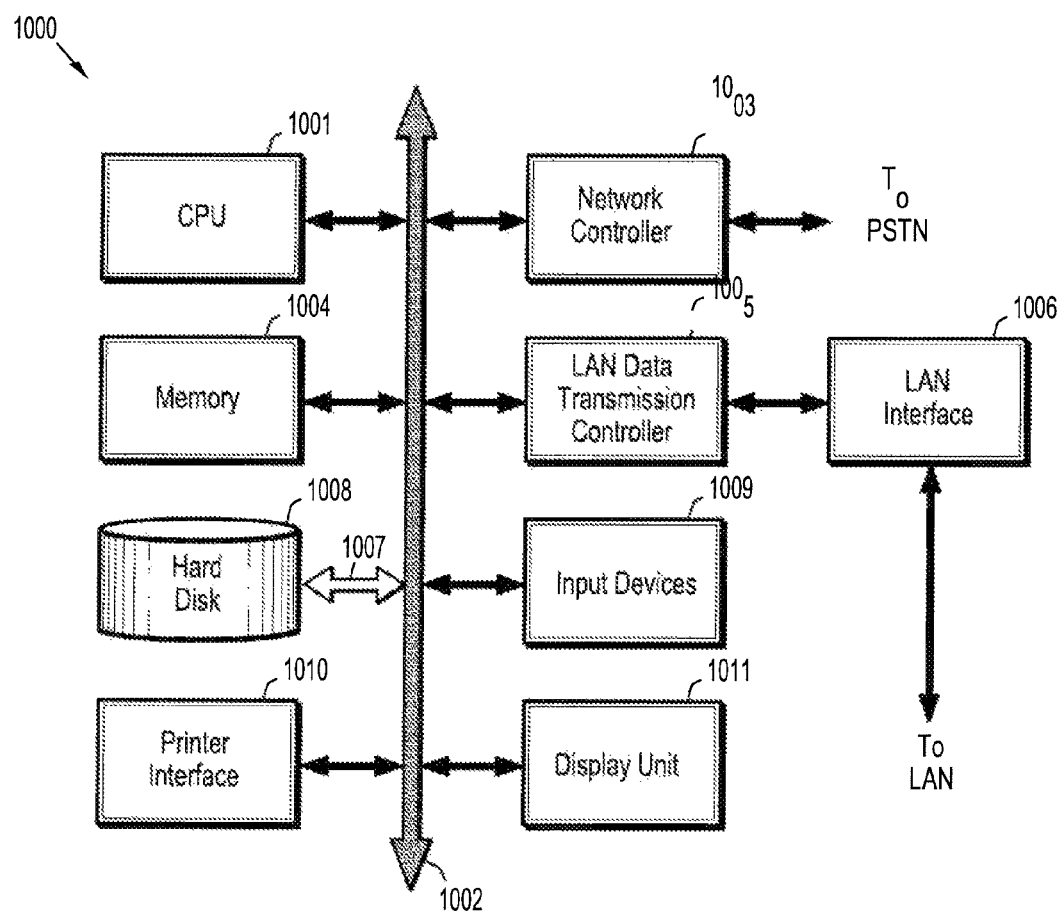
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for registering images of multiple modalities, comprising:
    acquiring first image of a subject using a first modality;
    acquiring second image of the subject using a second modality, wherein the first image includes greater structural detail of the subject than the second image and the second image is a video image including multiple image frames; and
    registering the first and second images using automatic point cloud to surface registration based on an anatomical structure observable in the first image and a foreign object proximate to the anatomical structure observable in the second image.

2. The method of claim 1, wherein the first modality is a computed tomography (CT) imager.

3. The method of claim 1, wherein the second modality is a fluoroscopy imager.

4. The method of claim 3, wherein no radio-contrast is used in acquiring the second image.

5. The method of claim 1, wherein registering the first and second images includes optimizing location constraints of the anatomical structure and the foreign object.

6. The method of claim 1, wherein the anatomical structure is a coronary sinus and the foreign object is a coronary sinus catheter.

7. The method of claim 1, wherein the anatomical structure is an aorta and the foreign object is an aortic catheter.

8. The method of claim 1, wherein the spatial relationship between the anatomical structure and the foreign object is known.

9. The method of claim 1, additionally including displaying a combined image including the first image overlaid with the second image, in a manner consistent with the registration, such that the greater structural detail of the first image is displayed as a video image including multiple image frames.

10. The method of claim 9, additionally including performing an electrophysiology procedure based on the displayed combined image.

11. The method of claim 10, wherein the electrophysiology procedure includes catheterization.

12. The method of claim 1, wherein registering the first and second images includes:
    segmenting the anatomical structure from the first image;
    segmenting the foreign object from the second image; and
    registering the first and second images using a known spatial relationship between the anatomical structure and the foreign object.

13. The method of claim 12, wherein the anatomical structure is automatically segmented from the first image using a segmentation algorithm.

14. The method of claim 12, wherein the anatomical structure is segmented from the first image using user-provided input.

15. The method of claim 12, wherein the foreign object is automatically segmented from the second image using a segmentation algorithm.

16. The method of claim 1, wherein the first image is a three-dimensional image and the second image is a three-dimensional image.

17. The method of claim 1, wherein the anatomical structure includes soft tissue that is not observable in the second image.

18. The method of claim 1, wherein the second image includes images from multiple angles.

19. A method for registering images of multiple modalities, comprising:
    acquiring a three-dimensional computed tomography image of a subject;
    acquiring a three-dimensional fluoroscopy image of the subject using a biplane fluoroscope; and
    automatically registering the three-dimensional computed tomography image and the three-dimensional fluoroscopy image based on an anatomical structure observable in the computed tomography image and a foreign object proximate to the anatomical structure observable in the fluoroscopy image.

20. The method of claim 19, wherein registering the computed tomography image and the fluoroscopy image includes optimizing location constraints of the anatomical structure and the foreign object.

21. A computer system comprising:
    a processor; and
    a program storage device readable by the computer system, embodying a program of instructions executable by the processor to perform method steps for registering images of multiple modalities, the method comprising:
    acquiring a three-dimensional computed tomography image of a subject;
    acquiring a two-dimensional fluoroscopy image of the subject; and
    automatically registering the computed tomography image and the fluoroscopy image using line-to-line registration based on an anatomical structure observable in the computed tomography image and a foreign object proximate to the anatomical structure observable in the fluoroscopy image.

* * * * *